United States Patent [19]

Siebert

[11] 4,196,677

[45] Apr. 8, 1980

[54] ANHYDROUS CONVERTER AND IMPLEMENT FOR APPLYING AMMONIA TO THE GROUND

[76] Inventor: Louie P. Siebert, R. R., Henderson, Nebr. 68371

[21] Appl. No.: 787,947

[22] Filed: Apr. 15, 1977

[51] Int. Cl.² ........................................... A01C 23/00
[52] U.S. Cl. ........................................ 111/7; 55/192; 55/193; 55/319; 62/51; 210/320; 210/539
[58] Field of Search ................... 111/6, 7; 62/51, 512, 62/526; 55/187, 201, 206, 193, 421, 319, 186, 188, 192, 189, 190; 210/320, 521, 522, 539, 540

[56] References Cited

U.S. PATENT DOCUMENTS

| | | | |
|---|---|---|---|
| 1,389,101 | 8/1921 | Orhvall | 55/206 X |
| 1,513,354 | 10/1924 | Wadsworth | 55/206 X |
| 1,630,673 | 5/1927 | Schwab et al. | 210/539 X |
| 1,667,139 | 4/1928 | Borden | 55/206 X |
| 1,780,101 | 10/1930 | Wagner | 55/187 |
| 1,907,166 | 5/1933 | Williams | 55/186 X |
| 1,970,783 | 8/1934 | Walker | 55/186 X |
| 2,057,257 | 10/1936 | Walker | 55/187 X |
| 2,057,883 | 10/1936 | Dehn | 210/539 X |
| 2,321,929 | 6/1943 | McGinnis | 62/512 X |
| 2,708,625 | 5/1955 | McGregor | 62/526 |
| 2,857,863 | 10/1958 | Jessen | 111/7 |
| 2,917,178 | 12/1959 | Unthank et al. | 210/521 X |
| 3,139,848 | 7/1964 | Welty | 111/7 |
| 3,184,065 | 5/1965 | Bradford | 210/539 X |
| 3,326,152 | 6/1967 | Frantzen | 111/7 |
| 3,372,658 | 3/1968 | Ammann | 111/7 |
| 3,978,681 | 9/1976 | Kjelgaard et al. | 111/7 X |
| 4,069,029 | 1/1978 | Hudson | 111/7 X |

FOREIGN PATENT DOCUMENTS 637313  10/1936  Fed. Rep. of Germany ............. 55/188

Primary Examiner—Edgar S. Burr
Assistant Examiner—Steven A. Bratlie
Attorney, Agent, or Firm—Zarley, McKee, Thomte, Voorhees and Sease

[57] ABSTRACT

An implement is provided for applying ammonia to the ground including a nurse tank feeding individual converters on each ground-working plow with each converter having an expansion cannister into which the gas is fed at the top and from which liquid is removed by gravity from the bottom and fed to the ground. A pair of downwardly facing flat baffles include a pair of concentric sleeves therebetween which receive the discharge end of an inlet feeding tube. Below the pair of baffles is a conical baffle having an axial opening and an outlet baffle with the pair of baffles and outlet baffle having downwardly extending peripheral flanges. Spaced apart inverted V-shaped notches are provided in the flange of the outlet baffle to prevent a vacuum at the outlet end of the cannister. A vent in the cannister is provided above the top pair of baffles and a second vent is provided between the conical baffle and the outlet baffle with both vents feeding gas to the ground and the second vent having a valve for controlling the flow pressure of liquid from the cannister.

8 Claims, 5 Drawing Figures

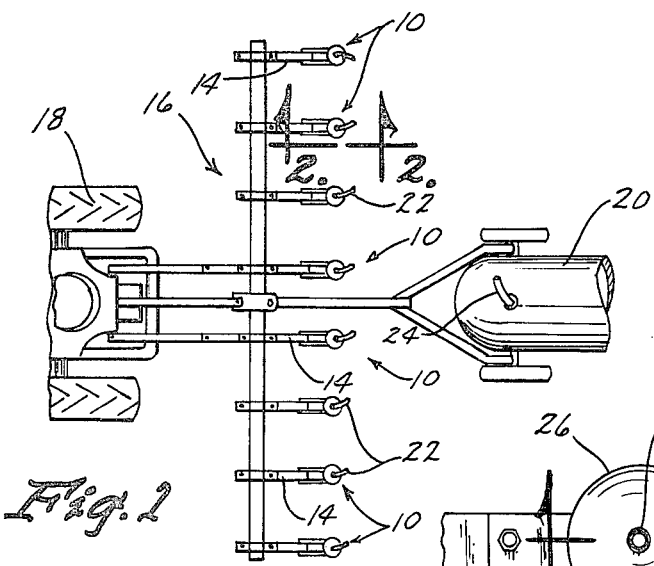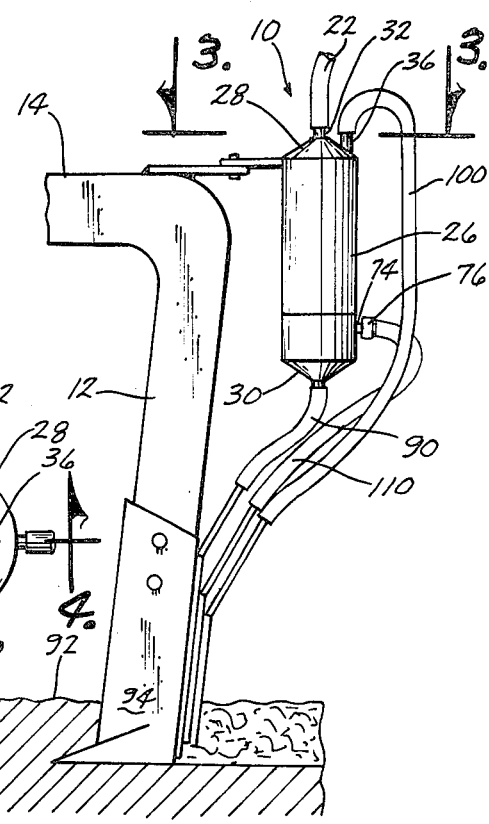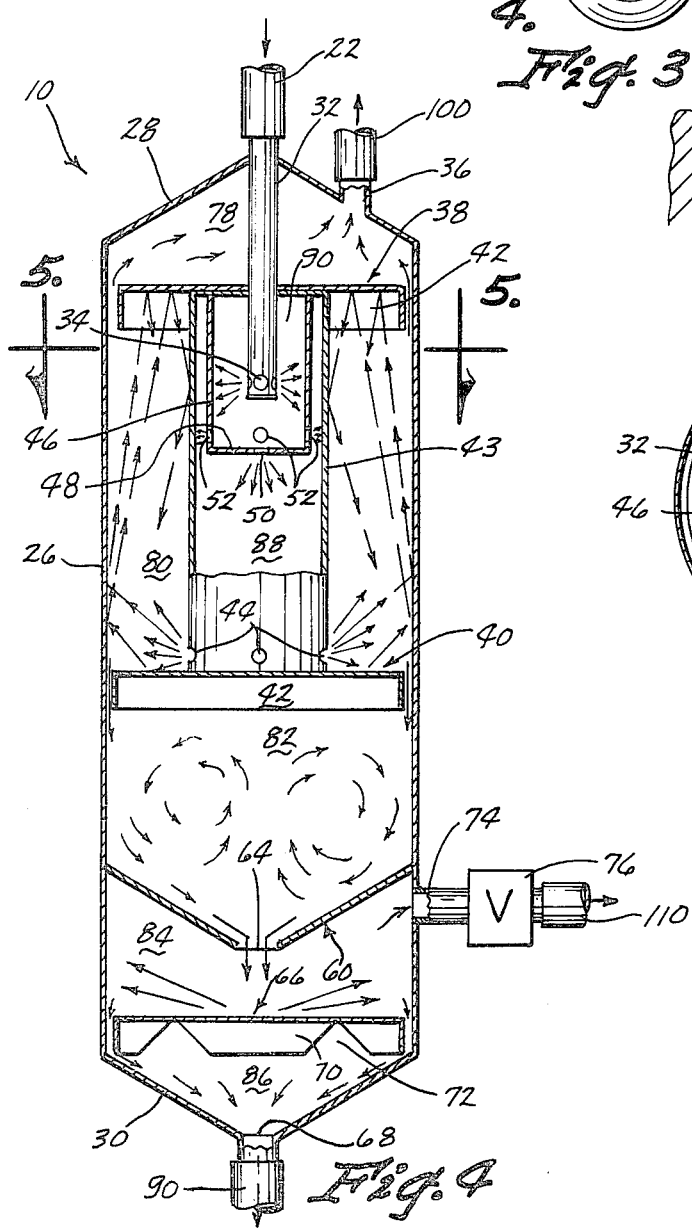

ANHYDROUS CONVERTER AND IMPLEMENT FOR APPLYING AMMONIA TO THE GROUND

BACKGROUND OF THE INVENTION

This invention relates to an improved implement for applying liquid ammonia to the ground over that disclosed in U.S. Pat. Nos. 3,978,681 and 2,612,760. In the conversion of gas ammonia to liquid for application to the ground it is desired that as much as possible of the gas be converted to liquid due to the high vaporization of gas and possible loss to the atmosphere upon discharge from the applicator. The location of the conversion unit relative to the point of application in the ground and the specific construction of the converter expansion cannister affect the efficiency of the gas to liquid conversion process and thus the effective utilization of ammonia supplied from a nurse tank.

SUMMARY OF THE INVENTION

In accordance with the present invention a nurse tank is provided on the applicator implement and it feeds individual converter units associated with each plow for each row whereby the liquid ammonia travels a very short distance after being converted from gas to liquid in the converter. Additionally, the specific internal construction of the converter facilitates the more efficient conversion process by appropriate circulation of the gas within the expansion cannister to provide maximum liquid as the end product of the process.

Specifically, the gas ammonia is fed into the top end of the cannister which has oppositely facing conical ends. The inlet tube is received in a pair of concentric sleeves which discharge the gas from the first sleeve laterally outwardly into the second sleeve which in turn discharges the gas laterally outwardly into into the cannister against the side walls where it is deflected upwardly against a top baffle of a pair of baffles and then downwardly against the bottom baffle of the pair of baffles. The pair of baffles have downwardly extending flanges past which the gas and fluid flow into a chamber above a conical baffle having an axial opening. The gas is circulated turbulently between the bottom baffle of the pair of baffles and the conical baffle and then discharged as liquid onto an outlet baffle just above the cannister outlet opening. The outlet baffle has a downwardly extending peripheral flange which has inverted notches for breaking up any vacuum that might tend to hold up flow of the fluid from the cannister. The cannister is vented at the top conical end wall and between the conical baffle and the outlet baffle with conduits connecting the vents of the plows for utiliziation of the gas in the plows. A control valve is provided on the bottom vent for varying the pressure on the liquid being discharged from the cannister since a certain amount of pressure may be necessary on a field cultivator, for example, to keep the liquid tubes free of soil. Also, temperature variations can cause a variance in tank pressure. Ordinarily, it is not desirable to pressurize the ammonia as it is being applied to the soil and thus the vents are provided for relieving this vapor pressure.

DESCRIPTION OF THE DRAWINGS

FIG. 1 is a fragmentary top plan view of a field implement including a nurse tank feeding a plurality of individual converter units positioned closely adjacent the point of application to the ground.

FIG. 2 is a side elevation view taken along line 2—2 in FIG. 1, and showing the location of the converter unit on the ground-engaging plow tool.

FIG. 3 is a top plan view taken along line 3—3 in FIG. 2.

FIG. 4 is an enlarged vertical cross-sectional view of the converter unit.

FIG. 5 is a cross-sectional view taken along line 5—5 in FIG. 4.

DETAILED DESCRIPTION OF THE INVENTION

The anhydrous converter of this invention is referred to generally in FIGS. 1 and 2 by the reference numeral 10 and is shown mounted on the vertical shank 12 of an implement frame 14 of an implement 16 pulled by a tractor 18. A nurse tank 20 is pulled behind the implement 16 and supplies ammonia gas to the individual converter units 10 through tubes 22 connected to a tube 24 on the nurse tank 20.

The converter unit 10 is shown in detail in FIGS. 4 and 5 and includes an elongated cylindrical cannister 26 having oppositely facing top and bottom conical ends 28 and 30. An inlet tube 32 extends through the axial center of the end 28 and has a plurality of side wall openings 34 while the axial end of the tube is closed. A vent opening 36 is provided in the top end wall 28 between the cannister side wall and the axial center of the cannister.

The upper end of the cannister includes a pair of spaced apart flat baffles 38 and 40 having downwardly extending flanges 42 in close proximity to the cannister side wall. A first sleeve 43 is fixed at its opposite ends to the axial center of the baffles 38 and 40 and includes lateral discharge openings 44 closely adjacent the bottom baffle 40. A second sleeve 46 is spaced from the first sleeve 43 along its side wall and includes a bottom end wall 48 positioned at approximately midway along the length of the first sleeve 43 and includes an axial discharge opening 50 and side openings 52. A conical baffle 60 is positioned below the bottom flat baffle 40 and is fixed to the cannister side wall around its peripheral edge but includes an axial opening 64. An outlet baffle 66 is positioned between the conical baffle 60 and the conical end wall 30 of the cannister 10 over a discharge opening 68 in the conical end wall 30. The outlet baffle 66 includes a downwardly extending peripheral flange 70 having inverted V-shaped notches 72 for preventing the formation of a vacuum at the discharge end of the cannister which would retard or prevent discharge of liquid ammonia from the cannister. A vent 74 is provided in the cannister side wall between the outlet baffle 66 and the conical baffle 60 and includes a metering valve 76 for varying the pressure applied to the liquid being discharged from the outlet opening 68.

Thus it is seen that a first chamber 78 is formed between the top flat baffle 38 and the top end wall 28. A second chamber 80 is provided between the pair of flat baffles 38 and 40 with a third chamber 82 being defined by the bottom baffle 40 and the conical baffle 60. The outlet baffle 66 cooperates with the conical baffle to define a fourth chamber 84 and the bottom conical end wall 30 and the outlet baffle 66 define a final fifth chamber 86 from which the liquid is discharged through the outlet axial opening 68.

In addition to the major expansion chambers 78, 80, 82, 84 and 86 are the chambers 88 and 90 within the first and second sleeves 43 and 46, respectively.

Thus it is seen in operation that ammonia at a temperature of minus 28° F. in liquid form under very little pressure is discharged through outlet 68 into tube 90 for deposit into the ground 92 behind plow share 94. In the past ammonia gas was applied to the soil under pressure which had to be knifed into a depth of about six to eight inches depending on soil conditions. With the expansion of the gas to liquid through the use of the converter unit 10 the ammonia gas is reduced in temperature and decompressed and thus it is possible to apply the ammonia to the soil at a depth of about two to three inches below the soil surface thus saving energy and gaining the application of ammonia close to the surface of the earth where it can give greater nutrition to the root zone of the crop. Ammonia travels down with the moisture and is soon out of reach of the root zone and thus lost whereupon it may enter the water table and provide possible water contamination.

Ammonia stored in the nurse tank 20 will be stored under pressures up to 100 p.s.i. with the average pressure being approximately 50 to 75 pounds. When the ammonia is released to the atmosphere or allowed to expand it cools very rapidly causing a refrigeration action. As ammonia cools it looses its pressurization. When the temperature drops to minus 28° F., ammonia is then in a liquid state and if the vapor is removed, it is depressurized to 0 pressure. Maximization of the decompression is accomplished through the travel of the gas through the series of chambers and baffles to retard or contain the flow of ammonia sufficiently long to allow it to cool and separate the liquid from any remaining gas. The ammonia enters the unit at chamber 90 at approximately 16 p.s.i. and leaves and enters chamber 88 through openings 50 and 52 with the pressure having dropped to approximately 12 p.s.i. The ammonia now leaves the chamber 88 through the openings 44 above the baffle 40 and enters chamber 80. On entering chamber 80 ammonia has almost reached minus 28° F. and has dropped in pressure to 2 p.s.i. and the vapor is now separating from the liquid. As the vapor rises to the top it is deflected by baffle 38. This action accomplishes two things. It retards the flowing action which results in separation of the liquid from vapor thus the liquid flows downward as the vapor ascends to the vapor exhaust port 36. This vapor is then piped through the tube 100 which feeds it to the ground. The liquid then flows down by gravity flow around the baffle 40 taking some of the vapor with it and maintaining a 2 p.s.i. This action is now being contained by the conical baffle 60 which functions as a drain baffle which deflects liquid downwardly and guides the liquid towards the center opening 64 into chamber 84. This liquid mixed with some vapor rotates in chamber 82 also causing a cooling action and thus separating the liquid and vapor before entering chamber 84. The liquid now being heavier than the vapor flows into chamber 84 dropping the pressure to zero by allowing the balance of the vapor and pressure to leave through the vent 74. Liquid now has dropped onto the outlet baffle 66 freeing itself from the balance of vapor and it flows down around baffle 66 and out the bottom outlet opening 68. The outlet baffle 66 being cupped and facing downwardly and having notches 72 cut in the sides of the flange 70 serves to break up any vacuum that might be created by the downward flow of the heavy liquid. Were it not for these notches a vacuum which might be created would cause a vapor lock and would stall the flow of liquid and would thereby cause the liquid to back up and overflow out the vents 36 and 74. The vapor leaving the vent 74 is also fed to the soil through the tube 110. The liquid ammonia, as previously indicated, is fed to the soil by gravity out through the bottom opening 68 and the tube 90.

I claim:

1. An anhydrous converter comprising,
    a cylindrical expansion cannister having a sidewall and outwardly facing conical shaped top and bottom ends with an inlet opening in the top end and an outlet opening in the bottom end on the axial longitudinal center of said cannister,
    vertically spaced apart top and bottom baffles in said cannister with the top baffle and said conical top end defining a first chamber and said top and bottom baffles defining a second chamber,
    a downwardly facing conical baffle positioned below said bottom baffle and defining a third chamber therebetween, said conical baffle having a center opening on the longitudinal axis of said cannister, said conical baffle being connected to the cannister sidewall such that said center opening is the only means for fluid passage past said conical baffle,
    an outlet baffle positioned between the bottom end of said cannister and said conical baffle defining a fourth chamber between said conical baffle and said outlet baffle and a fifth chamber between said bottom end and said outlet baffle,
    said top and bottom baffles and outlet baffle being flat and circular and having downwardly extending peripheral flanges positioned in close proximity to the cannister sidewall thereby to provide an annular passageway between each flange and the cannister sidewall, said annular passageways being the only passageways past said respective baffles,
    an inlet tube means positioned in said inlet opening and extending through said first chamber and terminating in an open inner end portion in said second chamber whereby fluid entering through said tube means moves through said cannister past said baffles and out said outlet opening as liquid,
    a first chamber vent through said cannister in communication with said first chamber, and
    a fourth chamber vent through said cannister in communication with said fourth chamber, said fourth chamber vent being positioned in the cannister sidewall between said conical baffle and said outlet baffle above said center opening of said conical baffle.

2. The structure of claim 1 wherein said downwardly extending peripheral flange on said outlet baffle includes circumferentially spaced inverted V-shaped notches to deter the formation of a vacuum by downward flow of liquid to said outlet opening.

3. The structure of claim 1 wherein said fourth chamber vent includes a control valve to regulate the pressure applied to liquid passing from said cannister through said outlet opening in said canister bottom end.

4. The structure of claim 1 further comprising,
    a first sleeve in said second chamber and affixed at its opposite ends to said top and bottom baffles, said first sleeve being positioned concentric with said cannister sidewall substantially midway between said inlet tube and sidewall and including openings only at its lower end adjacent said bottom baffle, a second sleeve coaxially positioned inside said first sleeve in spaced relation therefrom and affixed to said top baffle, said second sleeve being approximately half the length of said first sleeve and having a bottom end wall and openings for directing material laterally outwardly and downwardly toward said first sleeve, said inner end portion of the inlet tube being disposed within said second sleeve and spaced from said bottom end wall thereof.

5. An implement for row application of cold liquid ammonia to the ground comprising, an implement frame having a plurality of ground plows having ground working lower end portions, a nurse tank on said frame adapted for containing pressurized ammonia, a plurality of anhydrous converters, each operatively associated with a respective ground plow, each converter comprising a generally cylindrical expansion cannister having a sidewall and top and bottom ends with an inlet opening in the top end and an outlet opening in the bottom end and a plurality of spaced apart baffles within said cannister defining a plurality of expansion chambers between said baffles and top and bottom ends, said chambers being interconnected for the flow of ammonia from said inlet opening through said chambers and outwardly through said outlet opening, a supply conduit connecting said inlet opening to said nurse tank for receiving ammonia therefrom, and a discharge conduit having one end in communication with said discharge opening and terminating at the other end adjacent said lower end portion of a respective ground plow for transmission of ammonia into the ground, said outlet openings of said converters being positioned above and closely adjacent said lower end portions of the respective ground plows, said plurality of spaced apart baffles including vertically spaced apart top and bottom baffles in said cannister with the top baffle and said top end defining a first chamber and said top and bottom baffles defining a second chamber, a downwardly facing conical baffle positioned below said bottom baffle and defining a third chamber therebetween, said conical baffle having a center opening on the longitudinal axis of said cannister, said conical baffle being connected to the cannister sidewall such that said center opening is the only means for fluid passsage past said conical baffle, an outlet baffle positioned between the bottom end of said cannister and said conical baffle defining a fourth chamber between said conical baffle and said outlet baffle and a fifth chamber between said bottom end and said outlet baffle, said top and bottom baffles and outlet baffle being flat and circular and having downwardly extending peripheral flanges positioned in close proximity to the cannister sidewall thereby to provide an annular passageway between each flange and the canister sidewall, said annular passageways being the only passageways past said respective baffles, said converter further comprising an inlet tube means positioned in said inlet opening and extending through said first chamber and terminating in an open inner end in said second chamber whereby gas entering through said tube means moves through said cannister past said baffles and out said outlet opening as liquid, a first chamber vent through said cannister in communication with said first chamber, and a fourth chamber vent through said cannister in communication with said fourth chamber, said fourth chamber vent being positioned in the cannister sidewall between said conical baffle and said outlet baffle above said center opening of said conical baffle.

6. The structure of claim 5 wherein said downwardly extending peripheral flange on said outlet baffle includes circumferentially spaced inverted V-shaped notches to deter the formation of a vacuum by downward flow of liquid to said outlet opening.

7. The structure of claim 5 wherein said fourth chamber vent includes a control valve to regulate the pressure applied to liquid passing from said cannister through said outlet opening in said cannister bottom end.

8. The structure of claim 5 further comprising, a first sleeve in said second chamber and affixed at its opposite ends to said top and bottom baffles, said first sleeve being positioned concentric with said cannister sidewall substantially midway between said inlet tube and sidewall and including openings only at its lower end adjacent said bottom baffle, a second sleeve coaxially positioned inside said first sleeve in spaced relation therefrom and affixed to said top baffle, said second sleeve being approximately half the length of said first sleeve and having a bottom end wall and openings for directing material laterally outwardly and downwardly toward said first sleeve, said inner end of the inlet tube being disposed within said second sleeve and spaced from said bottom end wall thereof.

* * * * *